Sept. 1, 1959
S. WALLACK
2,902,605
DOSIMETER
Filed Aug. 25, 1953
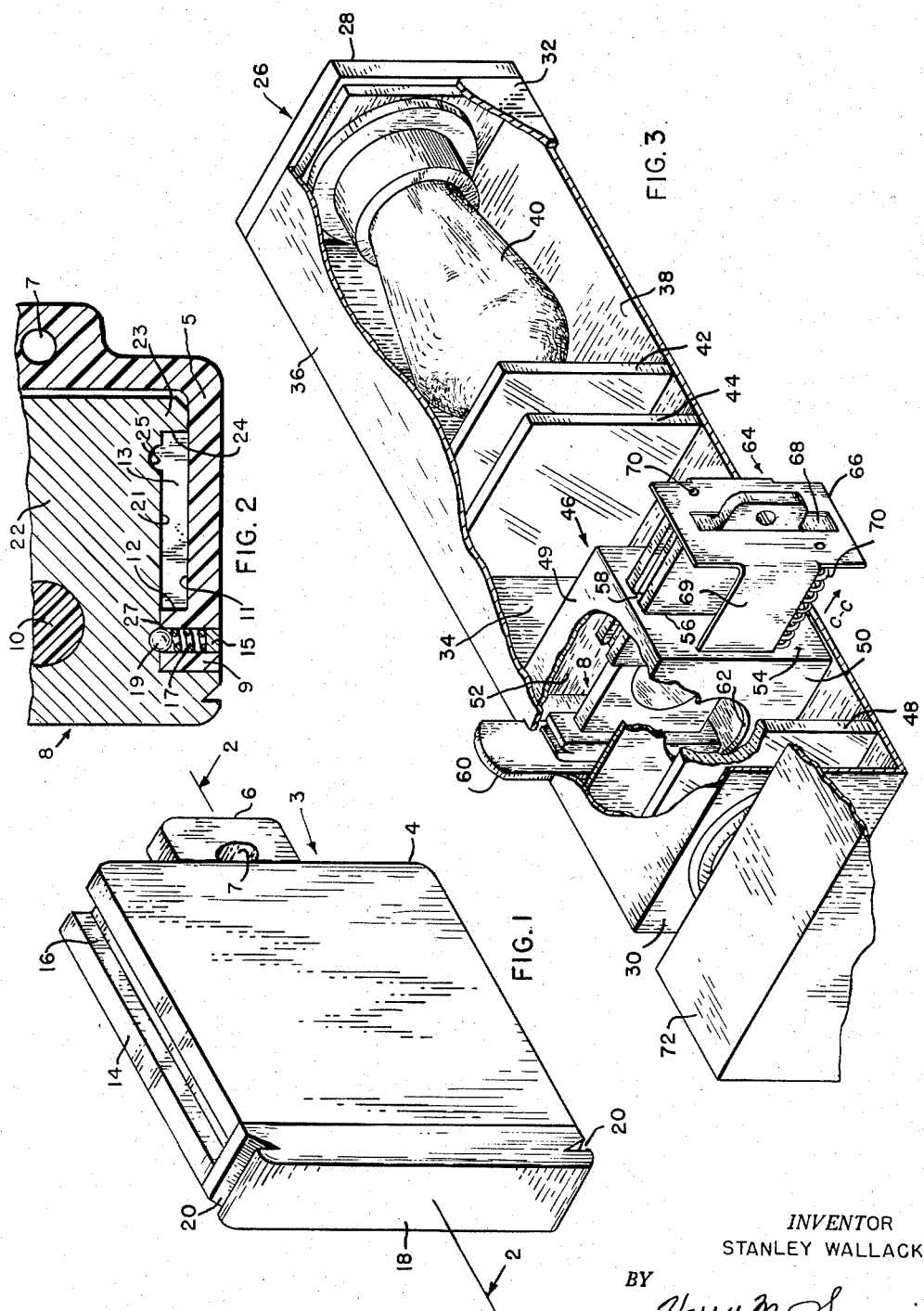
INVENTOR
STANLEY WALLACK
BY
*Harry M. Saragovitz*
ATTORNEY

United States Patent Office 2,902,605
Patented Sept. 1, 1959

2,902,605

DOSIMETER

Stanley Wallack, Jackson Heights, N.Y., assignor to the United States of America as represented by the Secretary of the Army Application August 25, 1953, Serial No. 376,537

6 Claims. (Cl. 250—83)

The present invention relates to dosimeters for gamma radiation and, more particularly, relates to an improved portable personnel dosimeter utilizing infrared sensitive phosphors as the dose measuring and indicating element.

A phenomenon associated with phosphors which has long been known is the "flash" of light emitted by certain phosphors when exposed to infrared radiation. Thus, when one of these phospohrs is excited by ultraviolet light, visible light, radioactive particles, or ionizing radiation, a certain brightness or flash will be superimposed upon the normal phosphorescent afterglow when the sample is exposed to infrared radiation. The intensity of this flash will differ for different materials and will also depend upon the wave length of the radiation.

In the operation of his phenomenon, it is believed that the exposure of an infrared sensitive phosphor to radiation results in the elevation of an electron from the ground state to a trapping or metastable state from which it cannot return directly to the ground state. However, infrared radiation supplies enough energy to the electron to raise it from this metastable state to the conduction zone from which it returns to the ground state with the emission of its characteristic radiation. During such stimulation, the electrons are in the conduction zone and the phosphor will thus exhibit the property of photoconductivity.

There are many phosphors which show high stimulability under infrared radiation. Examples of such phosphors are strontium sulfide activated with samarium and europium, strontium sulfide activated with samarium and cerium, strontium selenide containing sulfur and activated with samarium and europium and zinc sulfide activated with lead and copper.

A property common to all of these phosphors is the ability to store energy received as incoming radiation and later to liberate this energy in the form of light quanta when stimulated by radiation of the proper wave length. It can readily be seen that infrared sensitive phosphors may be utilized either alone or in combination with phosphors having high absorption of beta, gamma and X-rays as the basic element of a dosimeter. The infrared sensitive phosphor becomes excited when subjected to gamma radiation and stores this energy until a future time when it is stimulated by infrared radiation whereby it emits visible light. The brightness of the light bears a simple relationship to the roentgen dosage received and in this manner the integrated dosage received over a period of time may be determined.

Although it is necessary for persons working in or near active radiation areas to be provided with means for indicating the radiation dosage to which they have been exposed in order to avoid their being subjected to injurious overdosages, in many situations it is desirable that the person so working should not know the exact dosage to which he has been subjected. For example, one, who may be required to remain at a task or station wherein he may be subjected to radiation dosage approaching the maximum limit of safety, may be affected by excess anxiety if knowledge was to be had that the maximum of safety dosage approached, thus resulting in a consequent decline in his efficiency. However, if a dosimeter, which could be read periodically by an expert equipped with a suitable meter, was in the possession of this person, the knowledge of dosage absorbed would not be known except by the expert.

Accordingly, it is a primary object to provide a compact portable dosimeter for gamma radiation utilizing as the sensitive element therein, a phosphor or a combination of phosphors capable of storing the energy of gamma radiation and releasing the energy of such radiation upon being stimulated by infrared light.

It is a further object to provide an adaptor for receiving this dosimeter and for indicating the amount of gamma radiation to which the dosimeter has been subjected.

In accordance with the present invention, there is provided an apparatus for measuring dosages of gamma radiation exposure. It includes a dosimeter for gamma radiation comprising a case and an insert member receivable therein, the member being provided with a disc capable of storing the energy of gamma radiation and thereafter, upon being exposed to infrared light, emitting such energy as visible light. The present invention also includes a dosimeter adaptor for measuring the dosage of gamma radiation exposure of the dosimeter comprising a housing which includes therewithin a source of infrared light, a light shielding structure for receiving the dosimeter, means for removing the case from the insert member, thereby exposing the disc to the infrared light, the disc thereby emitting visible light. Also included in the apparatus is a measuring means responsive to the emitted visible light for indicating the dosage level of gamma radiation.

For a better understanding of the invention together with other and further objects thereof, reference is had to the following description taken in connection with the accompanying drawings and its scope will be pointed out in the appended claims.

In the drawings, Fig. 1 is a perspective view of a dosimeter in accordance with a preferred embodiment of the present invention. The dosimeter is shown in the closed position. Fig. 2 is a fragmentary vertical section taken along line 2—2 of Fig. 1 looking in the direction of the arrows and Fig. 3 is a perspective view, partly cut away, of an adaptor for exposing the dosimeter of Fig. 1 to infrared radiation whereby it emits measurable quantities of visible light, the dosimeter being shown in the exposed position in the adaptor.

Referring now more particularly to the drawings, in Figs. 1 and 2, there is shown a portable personnel gamma radiation dosimeter 3 comprising a case 4 having a tab-like appendage 6 extending outwardly from one end thereof. Appendix 6 is provided with a hole 7 therethrough to receive a wire bail or other suitable device in order to enable the grasping and extending of case 4. An insert member 8 as shown in Fig. 2, is provided which is sildable in and out of case 4. Mounted within member 8 is a translucent disc 10. Case 4 is adapted to receive member 8 therein and is made of a material which is light in weight and transparent to gamma radiation but opaque to infrared, visible and ultraviolet light. Black Bakelite is an example of a suitable material in this regard. In a side wall 14 of case 4 is a longitudinally disposed guide notch 16 which is coextensive with wall 14 and is adapted to receive a slide fin 58 therein as will be explained below. Member 8 comprises a handle 18 having notches 20 in each end thereof and a panel 22 integral with or affixed to the handle in a suitable manner. Handle 18 having notches 20 therein is provided to permit a good finger grip for manually opening the dosimeter for inspection or other purposes which may require such opening. Panel 22 is provided with a hole therethrough which is nearer the handle end than the distal end of the panel. Panel 22 is configured to be received snugly in case 4 and is slidable in and out thereof. Member 8 preferably is composed of a material which is opaque to radiation other than gamma radiation such as aluminum. In the hole in panel 22 is mounted a translucent disc 10 comprising an infrared sensitive phosphor material and an acrylate resin in preferable proportion of about 3% phosphor and the remainder resin. The phosphor in disc 10 is capable of storing the energy of gamma radiation and emitting this energy as visible light upon thereafter being exposed to infrared radiation. Since case 4 and member 8 are opaque to ultraviolet, visible and infrared light but transparent to gamma radiation, the energy stored in the phosphor is due only to gamma radiation. The base portion 5 of case 4 terminates at its handle end in an upward vertical extension 9, extending from inner surface 11 of base portion 5 and integral therewith thereby providing a vertical wall 12 as shown. The base 21 of panel member 22 terminates at its distal end in a downward vertical extension 23 which abuts against inner surface 11 of base portion 5 thereby providing vertical wall 24. By this arrangement, a rectangular opening 13 bounded by inner surface 11, base 21, and walls 12 and 24 is provided. Vertically extending through extension 9 and base portion 5 is a substantially cylindrical aperture closed at one end by a plug 15 and at the other end by a ball 19 with a compressible spring 17 disposed intermediate the plug and the spring. Base 21 is provided with spaced linearly aligned sockets 25 and 27 adapted to engage ball 19 when case 4 is in the open or closed positions, respectively of dosimeter 3. By this arrangement a ball and detent structure is effectively provided. It is to be understood, of course, that other suitable detent arrangements may be used.

Fig. 3 is a perspective view, partly cut away, of an adaptor especially suited for measuring the dosage of gamma radiation exposure present in the dosimeter of Fig. 1. A housing 26 comprises end walls 28 and 30, side walls 32 and 34 and upper and lower walls 36 and 38. Positioned within housing 26 is a source of infrared light, a light shielding structure to receive the dosimeter and infrared blocking or opaque filter 48, following the shielding structure. The infrared light source comprises a source of light such as light bulb 40 adjacent end wall 28 and transversely disposed infrared filters 42 and 44 in parallel spaced relationship positioned in front of and spaced from bulb 40. It is to be understood that the term infrared filters has the conventional meaning of filters which will only pass infrared light. The light shielding structure 46 is substantially rectangular and is disposed in front of and spaced from infrared filters 42 and 44. Structure 46 comprises an upper wall 49 and a lower wall (not shown), end walls 50 and 52 disposed in planes parallel to the planes of end walls 28 and 30 of housing 26 and side wall 54. Side wall 54 has an opening 56 therethrough for receiving case 4 and for permitting egress and ingress of the case into structure 46, opening 56 having the same configuration as a vertical transverse cross section of case 4. A slide fin 58 is provided which extends downward from the upper margin of upper wall 49 and extends along the inner surface of upper wall 49 to a point where it abuts against the inner surface of handle 18 when the dosimeter is in structure 46. Fin 58 is adapted to be received by notch 16 as hereinabove described. A removable light shield and backstop 60 is provided in wall 34 to permit insertion of dosimeter 3 into structure 46. End walls 50 and 52 of structure 46 have substantially circular openings 62 in register therethrough, approximately the size of disc 10. A U-shaped bracket 64 having an opening 68 through its base 66 for receiving tab 6 of case 4 and having arms 69 which extend into structure 46, is provided to permit case 4 to extend from member 8. U-shaped bracket 64 is normally urged into an inward position by a pair of springs 70 which extend from base 66 of bracket 64 to structure 46. Intermediate end wall 30 of housing 26 and structure 46 is a filter 48 which is opaque to infrared light. Responsive to light transmitted through filter 48 is a photomultiplier 72, the construction and operation of which is well known in the art and its specific construction has been omitted.

In operation, dosimeter 3 which has been subjected to gamma radiation is placed in structure 46 by removing backstop 60 from housing 26 and inserting dosimeter 3 therethrough into the structure, tab 6 extending through opening 66 in base 68 of bracket 64. A wire bail is inserted in hole 7 and case 4 is pulled outwardly in the direction of the arrow C—C against the tension of the springs 70. This causes case 4 to be withdrawn from panel 22 sufficiently to expose fully disc 10 to the infrared light. At this point disc 10 is in alignment with holes 62. In this position, it is to be seen that the presence of slide fin 58 serves to hold, rigidly, member 8 in place thereby preventing the lateral movement of phosphor disc 10. It is also to be noted that when member 8 is inclosed in case 4, ball 19 engages socket 27 thus preventing an accidental opening of dosimeter 3. As case 4 is extended from member 8, when the dosimeter is inside structure 46, ball 19 is guided along base 21 to the point where it is received in socket 25 and walls 12 and 24 are then in abutment thereby maintaining the dosimeter in the open position. Bulb 40 is turned on; its light is filtered by filters 42 and 44 so that only infrared light hits disc 10 and the phosphor therein, having been previously exposed to gamma radiation, now emits visible light due to the infrared light exposure. The emitted visible light is filtered through infrared opaque filter 48 and the filtered light passes to photomultiplier 72. Photomultiplier 72 is pre-calibrated to enable determination of the roentgen dosage to which the dosimeter has been subjected. It is to be seen that disc 10 of the dosimeter is always protected from all but gamma radiation and while in the housing of the adaptor is only exposed to infrared light provided by the filtering of the light from bulb 40 through infrared filters 42 and 44. In this manner, extremely great accuracy of gamma radiation dosage measurement is obtained.

While there have been described what are, at present, considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An apparatus for measuring dosages of gamma radiation including a dosimeter for gamma radiation comprising a case and an insert member receivable therein which are opaque to visible, infrared and ultraviolet light and transparent to gamma radiation, a translucent disc mounted in the insert member comprising a phosphor capable of storing the energy of gamma radiation upon being exposed to such radiation and thereafter emitting such energy in the form of visible light upon being exposed to infrared light; and an adaptor for measuring the dosage of gamma radiation exposure of the dosimeter comprising a housing, the housing including therewithin a source of infrared light, a light shielding structure for receiving the dosimeter, means for extending the dosimeter case from the insert member while the dosimeter is within the structure to expose the gamma irradiated translucent disc to the source of infrared light whereby the disc emits visible light, means for retaining said insert member within said structure while said case is being moved to extended position, means opaque to infrared light for filtering said visible light and measuring means responsive to said filtered visible light for indicating the dosage level of gamma radiation.

2. An apparatus as in claim 1 wherein the light shielding structure includes end walls having openings therethrough substantially equal in size to said translucent disc and in alignment with the disc when said disc is exposed within the structure.

3. A dosimeter for gamma radiation comprising a panel having a hole therethrough, a disc comprising a phosphor capable of storing the energy of gamma radiation and a translucent material in said hole and a case comprising a material opaque to infrared, ultraviolet, and visible light and transparent to gamma radiation, said case having a slot therein for receiving the panel and spring actuated detent means for securely holding said panel in two positions, said disc being wholly within said case in one position and outside said case in the other position.

4. A device adapted for measuring the dosage of gamma radiation exposure of a dosimeter wherein said dosimeter comprises a panel having a hole therethrough, a translucent disc comprising a phosphor capable of storing the energy of gamma radiation in said hole, and a case comprising a material opaque to infrared, ultraviolet and visible light and transparent to gamma radiation and having an opening therein for receiving the panel comprising; a housing, the housing including therewithin a source of infrared light, a light shielding structure for receiving said dosimeter, removable means in said housing to permit insertion of the dosimeter into the light shielding structure, means actuable from outside said structure for extending the dosimeter case from the panel when the dosimeter is within the structure to expose the gamma irradiated translucent disc to the infrared light whereby the disc emits visible light, means opaque to infrared light for filtering the visible light and measuring means responsive to the filtered visible light for indicating the dosage level of gamma radiation.

5. A device as in claim 4 wherein the light shielding structure includes end walls having openings therethrough substantially equal in size to said translucent disc and in alignment with the disc when said disc is exposed within the structure.

6. An apparatus for measuring the extent of exposure to gamma rays of a dosimeter, said dosimeter comprising a casing, a panel slidable into a slot in said casing and having a material thereon adapted to be activated by gamma rays, said casing being opaque to activating rays other than gamma rays; said apparatus comprising an opaque housing having therein an exposure measuring means for measuring the amount of gamma rays to which said panel has been exposed while enclosed in said casing, said dosimeter being receivable in said housing, and means operable from outside of said housing for exposing said panel to said exposure measuring means.

References Cited in the file of this patent
UNITED STATES PATENTS

| | | |
|---|---|---|
| 2,071,471 | Neubert | Feb. 23, 1937 |
| 2,486,026 | Hills | Oct. 25, 1949 |
| 2,585,551 | Hofstadter | Feb. 12, 1952 |
| 2,616,051 | Daniels | Oct. 28, 1952 |
| 2,650,309 | Webb et al. | Aug. 25, 1953 |
| 2,663,801 | Slavin et al. | Dec. 22, 1953 |
| 2,664,511 | Moos | Dec. 29, 1953 |
| 2,667,586 | Kallmann | Jan. 26, 1954 |
| 2,730,625 | Shurcliff | Jan. 10, 1956 |
| 2,738,430 | Shulman et al. | Mar. 13, 1956 |
| 2,761,070 | Moos et al. | Aug. 28, 1956 |
| 2,787,714 | Shulman et al. | Apr. 2, 1957 |